May 12, 1970     B. M. CRAIG     3,511,016
SEED-TAPE MANUFACTURE
Filed March 4, 1968     4 Sheets-Sheet 1
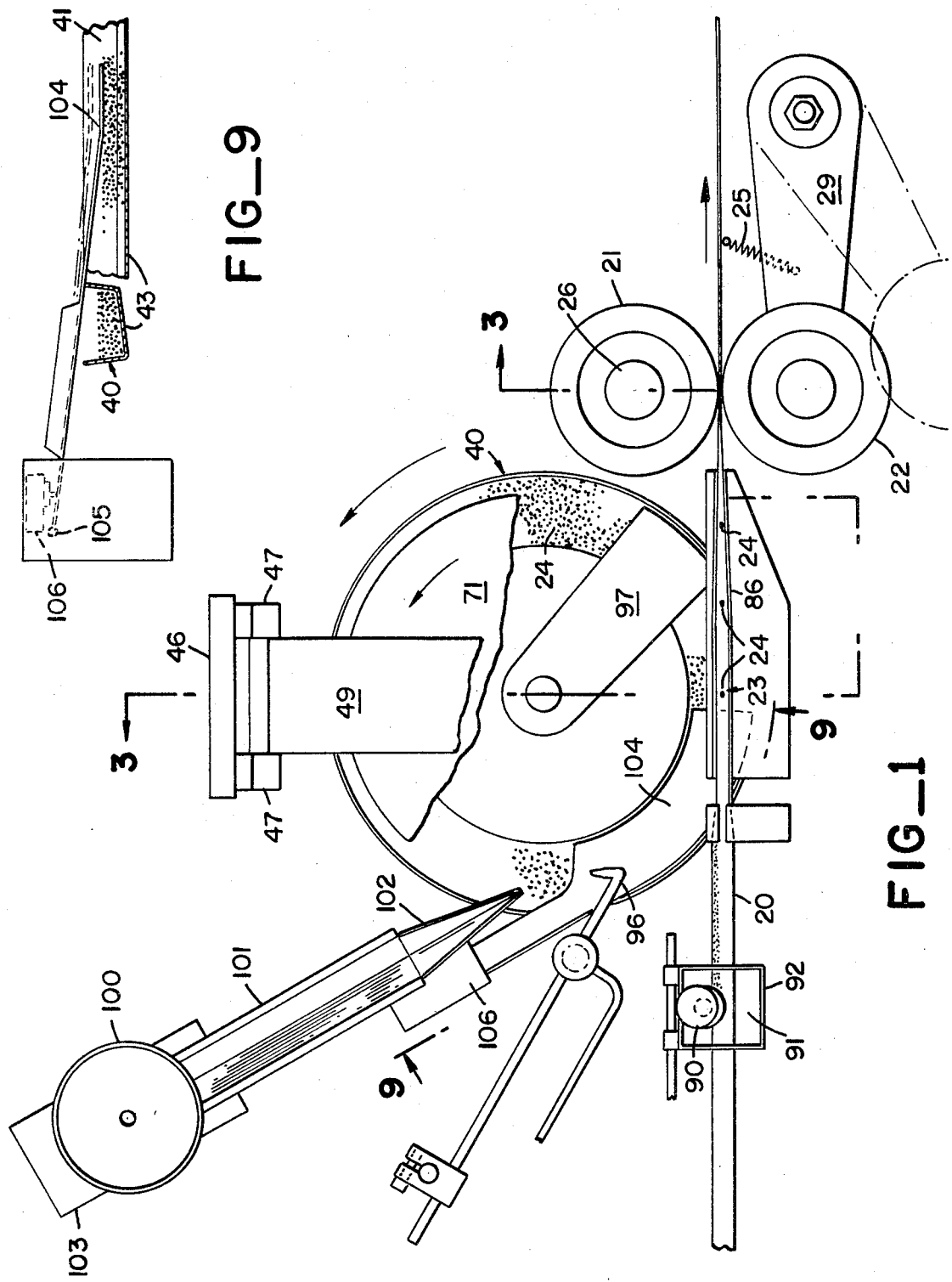
INVENTOR.
BURNIE M. CRAIG
BY
Owen, Wickersham & Erickson
ATTORNEYS

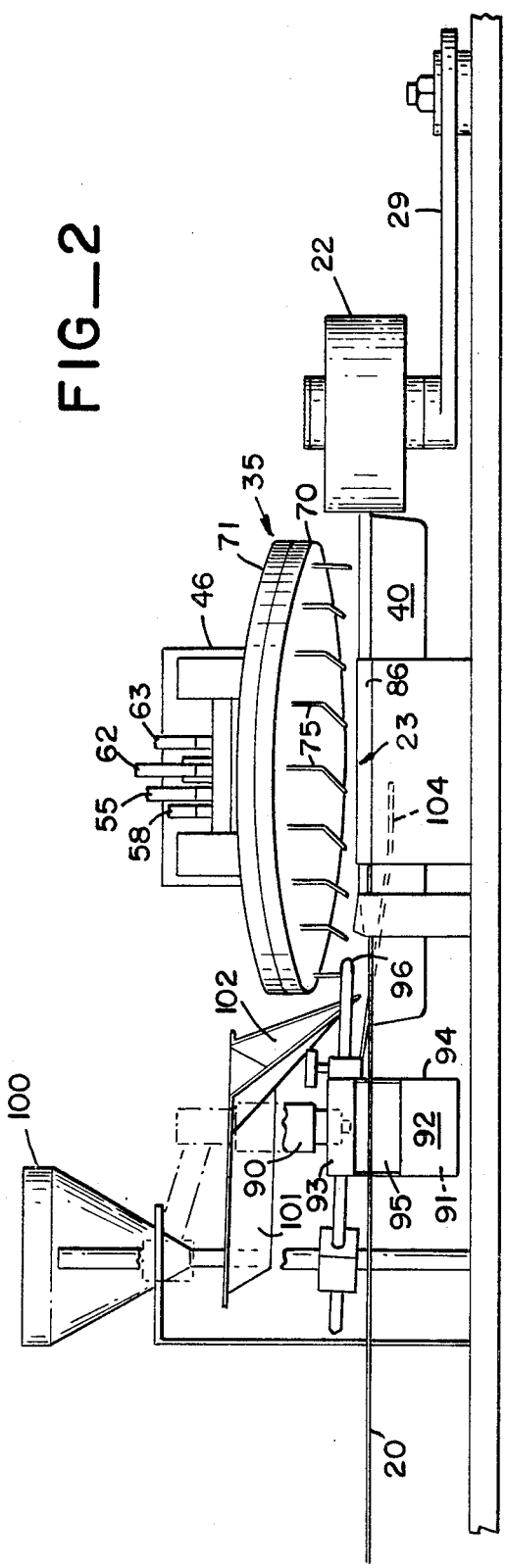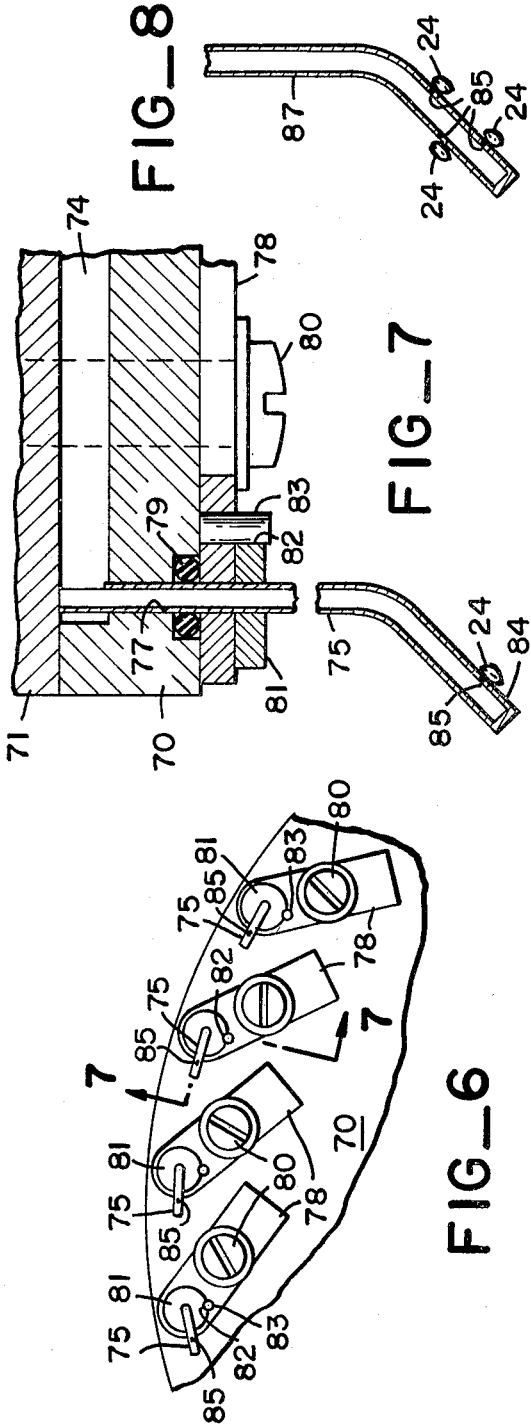

May 12, 1970
B. M. CRAIG
3,511,016
SEED-TAPE MANUFACTURE
Filed March 4, 1968
4 Sheets-Sheet 3
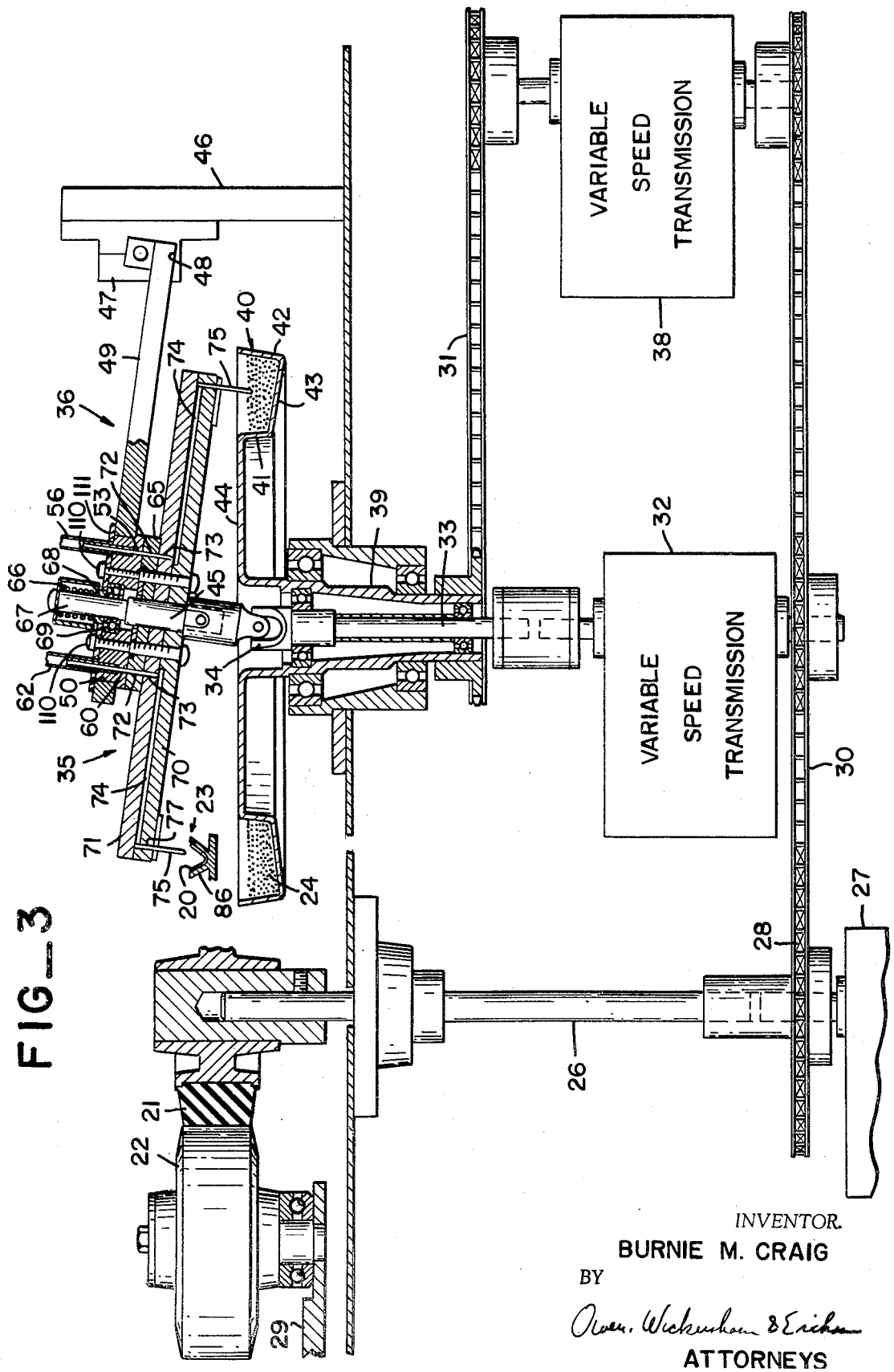
FIG_3
INVENTOR.
BURNIE M. CRAIG
BY
Owen, Wickersham & Erickson
ATTORNEYS May 12, 1970    B. M. CRAIG    3,511,016
SEED-TAPE MANUFACTURE
Filed March 4, 1968    4 Sheets-Sheet 4
FIG_4
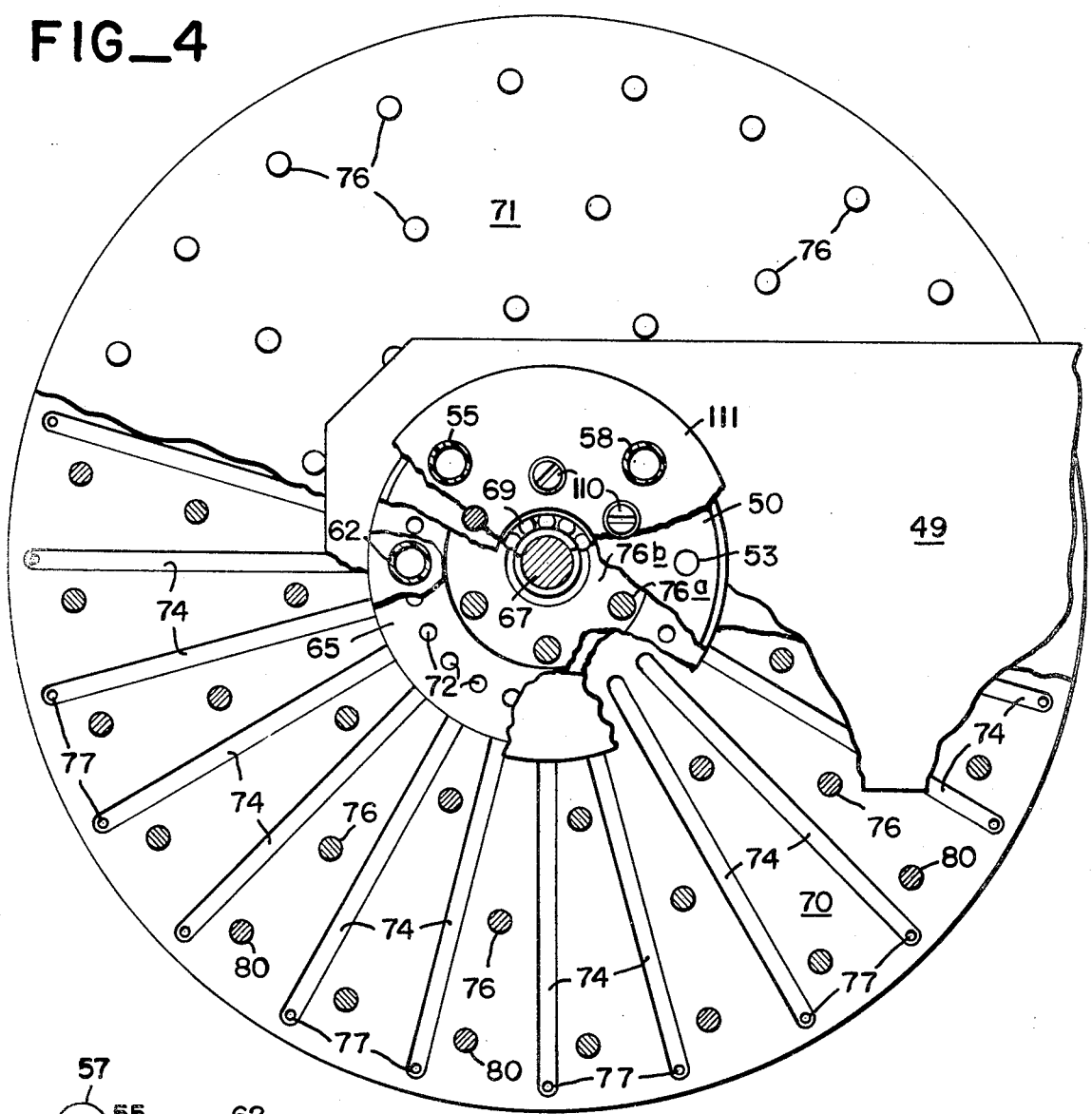
FIG_5
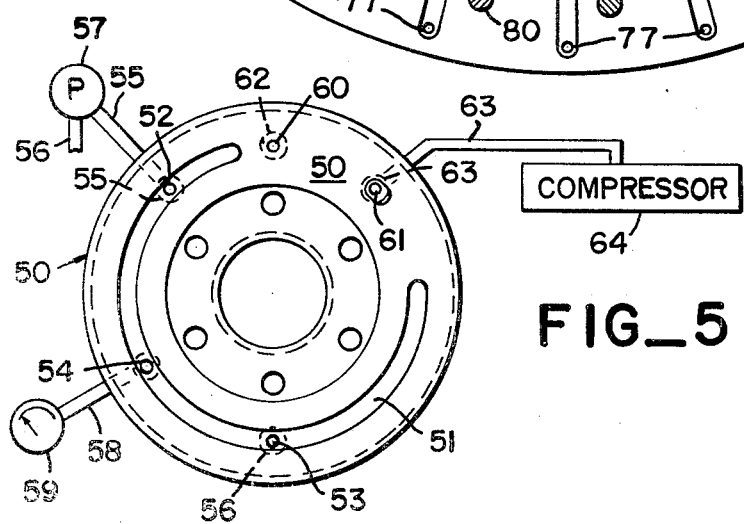
INVENTOR.
BURNIE M. CRAIG
BY
Owen, Wickersham & Erickson
ATTORNEYS

United States Patent Office 3,511,016
Patented May 12, 1970

3,511,016
SEED-TAPE MANUFACTURE
Burnie M. Craig, Pasadena, Calif., assignor to Soilserv, Inc., Salinas, Calif., a corporation of California
Filed Mar. 4, 1968, Ser. No. 710,014
Int. Cl. B65b 9/06
U.S. Cl. 53—28
43 Claims

ABSTRACT OF THE DISCLOSURE

An annular seed-containing tray is rotated horizontally, while a rotating seed-pickup assembly above the tray is inclined from horizontal, its nozzles dipping into said tray to pick up seeds by vacuum. They rise from the tray to a high point where the vacuum is released and the seeds are dropped onto a moving tape. The tangential velocity of the nozzles is approximately the same as the linear velocity of the tape, and changes in velocity of the tape cause proportional changes in the velocities of the pickup assembly and tray. Spacing of seeds on the tape is varied by varying the relative velocities of the tape and pickup assembly. The tray and pickup assembly rotate in the same direction and their relative speed is variable. Preferably, the tape is troughed before receiving seed and before that is moistened, as by sparsely spraying water on less than half the tape, all to one side of its center line. After dispensing the seed, the nozzles are blown out to keep them clean, while the tray is protected from the blowing. A level detector overlies the seeds in the tray and activates feeding means to supply the tray with more seeds when the level drops below a predetermined height. Also, an air jet is directed at each nozzle before it reaches the tape, for dislodging excess seeds that may have been picked up.

---

This invention relates to improvements in the manufacture of seed tapes. It improves upon the method and apparatus disclosed in patent application Serial No. 605,251, filed Dec. 28, 1966, by Rohnert et al., now abandoned, enhancing the accuracy and speed of the seed dispensing portion and accurately synchronizing adjustments relative to the picking up, dispensing, and spacing on the tape of seeds. More accurate and more efficient moisturizing of the seed tape is coupled with improved control thereof. Additional seeds are automatically supplied as needed by the dispensing device, and the seeds are kept level in the tray from which they are picked up. Also, seed pickup nozzles are freed from any unwanted excess seeds they may pick up.

It is important for the seeds to be spaced precisely at regular intervals on the seed tape, and it is important that the intervals be readily adjustable to any desired spacing. The problems encountered in achieving these objectives have been solved in the present invention by, first, having the rotating assembly for dispensing seeds driven by the very member which determines the velocity at which the tape is driven past the seed dispensing station, so that the spacing, once set, remains constant. Second, a variable speed transmission enables the velocity of the rotating assembly to be increased or decreased relative to the velocity of the tape, so that the spacing between seeds can be varied without having to change the spacing of the seed pickup and dispensing nozzles on the rotating assembly.

High manufacturing speeds, and hence high-speed tape movement are essential for economical production of seed tape, and high speeds have made it difficult to assure substantially 100% pickup of seeds by the nozzles. This problem is solved in the present invention by replacing the old stationary seed hopper with an annular rotating seed tray. The seed tray and the nozzles rotate in the same direction, the seed tray being level, while the nozzles, on an inclined plane, dip into and rise from the tray. By having the seed tray rotate, the relative speed of the nozzles and seeds is much lower than the absolute speed of the nozzles; if the seed tray and nozzles move at the same speed, the relative speed approaches zero at pickup. While rotation at the same speed is not practical with very fast nozzle speeds, because of the effect of centrifugal force on the seeds in the tray, the relative speed may even then be, say, one-half of the absolute nozzle speed, and this reduction in relative speeds greatly improves pickup, making it possible for every nozzle to pick up a seed every time, with only rare misses.

The device illustrated in patent application Ser. No. 605,251, now abandoned, had a series of radially extending tubes with nozzles depending from their outer ends, and the tubes were guided by a cam down into and then out from a stationary seed tray. In the present invention the conduits are provided by grooves in one of a pair of rotary plates. The annular rotating seed tray is disposed on a horizontal plane, and the plane of the rotary plates is tilted relative to horizontal, so that its nozzles are caused to dip down into the seed tray and then to rise up out of the seed tray, each nozzle picking up its seed. The seed tape is passed above the seed tray and beneath the nozzles at the point where the nozzles are at about their highest level above the seed tray. Shortly before that point, an air jet is used to eject from each nozzle any excess seeds which, under some circumstances, tend to get carried along. This greatly improves the quality of the seed tape by eliminating so-called doubles, i.e., more seeds at each point than are intended.

As in patent application Ser. No. 605,251, now abandoned, the nozzles are blown out after the seed has been dropped onto the seed tape, to assure that each nozzle is clean and ready to pick up its next seed. In the present invention a plate covers the annular seed tray at this point, so that the seed in the tray is not blown on during the nozzle cleaning operation. This plate is a stationary member located past the seed-dispensing station, and the cleanout jet of air through the nozzle is dissipated harmlessly against this plate.

As before, the seeds are picked up by vacuum and are released by a bleed to atmospheric pressure, or, in some cases, the addition of a small amount of above-atmospheric pressure.

The present invention also provides a device for leveling the seeds in the seed tray, so that when the nozzles dip down, they do not simply pass into a furrow made by preceding nozzles. This leveling device acts also as a seed level detector which automatically actuates a device for feeding additional seeds into the seed tray when the level drops below a predetermined height.

An improved moistening device is provided. Water-soluble polyethylene oxide, the preferred seed-tape material, is to be folded and sealed together by the moisture on it, and it is important to keep at least certain kinds of seed from being moistened, because moisture on the seed can affect or effect germination of the seed. The present invention employs a spray that sparsely deposits water only on one side of the center line of one face of the tape, the sprayed area preferably being spaced from the center line, so that even that sparsely applied moisture does not touch the seed.

An improved troughing device employs a rigid trough to which the tape is conformed during deposit of the seeds on the tape.

An important consideration is the timing of the release of the seed from the nozzle aperture when the nozzle is above the type. The invention enables adjustment of this timing to get very accurate results.

Other objects and advantages of the invention will appear from the following description of a preferred embodiment.

In the drawings:

FIG. 1 is a top plan view of the seed-dispensing portion of a seed-tape manufacturing machine embodying the principles of the invention, with the front portion of the rotating seed-pickup and dispensing assembly broken away to show the parts underneath.

FIG. 2 is a view in front elevation of the apparatus of FIG. 1.

FIG. 3 is a folded view in elevation and in section, taken along the irregular line 3—3 in FIG. 1, with a portion of the drive roller broken off and with some parts in the background omitted.

FIG. 4 is a top plan view of the rotating seed-pickup and dispensing assembly and the overlying stationary plates, with successive layers broken away successively, all the layers being symmetrical.

FIG. 5 is a bottom plan view of the stationary plate that lies near the top of the assembly of FIG. 4.

FIG. 6 is a fragmentary bottom plan view of a portion of the assembly of FIG. 4, enlarged to show the nozzle mounting and with a portion of one nozzle clamp broken away to show what is otherwise obscured by it.

FIG. 7 is a greatly enlarged view in section taken along the line 7—7 in FIG. 6.

FIG. 8 is a fragmentary view in section of a portion of a modified form of nozzle structure.

FIG. 9 is a view in elevation and in section taken along the line 9—9 in FIG. 1.

Tape 20, preferably water-soluble polyethylene oxide, is driven by a pair of rollers 21 and 22 that are located past a seed dispensing station 23, as shown in FIGS. 1 and 2. One roller 21 is a drive roller, while the other one is an idling roller 22, and they also close and seal the tape 20 to encapsulate seeds 24 therewithin. A spring 25 preferably urges the idler roller 22 against the drive roller 21, and the idler roller 22 is preferably mounted rotatably on a lever arm 29 so that it can be swung away from the drive roller 21 when desired.

The drive roller 21 is mounted on a shaft 26 which is driven by a motor 27. As shown best in FIG. 3, the shaft 26 carries sprockets 28 that drive a chain 30. The chain 30 drives, through a variable transmission 32, a vertical shaft 33 which, through a universal joint 34, drives a rotating assembly 35, the seed pickup and dispensing assembly. This rotating assembly 35 is supported by a stationary assembly 36 at an inclination to the horizontal. The chain 30 also drives, through a variable transmission 38 and a chain 31, hollow vertical shaft 39, which encircles the shaft 33 and is concentric with it. On the upper end of this hollow shaft 39, or integral with it, is mounted an annular seed tray 40 which is preferably mounted in a horizontal plane. Preferably, the tray 40 is shaped as shown in FIG. 3, having steeply sloping inner and outer walls 41 and 42 and a bottom wall 43 which is slightly tilted downwardly from the inside out, to help with the centrifugal force problem. The inner wall 41 is connected to the shaft 39 by a shelf 44.

Thus, the seed tray 40 and the rotating seed pickup and dispensing assembly 35 are both driven from the shaft 26 which drives the drive roller 21 that propels the tape 20. Hence, the speed of the tape 20 is directly governed by the same device that controls the speed of the tray 40 and assembly 35. A change in speed of the tape 20 effects a proportional change in the speeds of the seed tray 40 and the assembly 35. Also, the variable speed transmissions 32 and 38 enable the speed of the assembly 35 and the speed of the tray 40 to be separately adjustable relative to each other and to the tape 20. Once so adjusted, the speed of the tape drive shaft 26 again controls the speeds of the assembly 35 and the tray 40, as well as directly controlling the speed of the seed tape 20 through the drive roller 21.

The universal joint 34 is separably connected to a shaft 45 by a slot-and-pin drive (see FIG. 3). The stationary support assembly 36 includes a standard 46 with a pair of pillow blocks 47 that support a trunnion 48 for an arm 49, so that the arm 49 can be swung up for servicing. The arm 49 carries a stationary plate 50. The plate 50 has (see FIG. 5), on its lower surface, a long annular segment groove 51 which extends about 270° (e.g., 263°), from which, preferably, three openings 52, 53, and 54 extend through the plate 50. The two openings 52 and 53 are connected by conduits 55 and 56 to a vacuum pump 57, the purpose of the dual openings 52 and 53 being to evacuate more quickly and more accurately, since the width of the groove 51 is limited. The third opening 54 is connected by a conduit 58 to a gauge 59 which indicates the actual vacuum in the groove 51, as distinguished from that of the pump 57. Circumferentially aligned with the groove 51, i.e., at the same radius, and spaced from it and from each other, are two additional openings 60 and 61. The opening 60 is connected either directly to atmosphere by an atmospheric bleed conduit 62 or, if desired, to a source of very light pressure, providing pressure very slightly above atmospheric, usually in the nature of less than one inch of water thereabove. The opening 61, which is larger than the opening 60 and may be considered a short arcuate groove, is connected by a conduit 63 to a source 64 of compressed air several pounds above atmospheric pressure.

The rotating assembly 35 includes a small plate 65 (see FIGS. 3 and 4) which lies below and snugly against the stationary plate 50, with the aid of a spring 66 (FIG. 3) around a shaft portion 67 and bearing through a thrust washer 68 on a ball bearing 69 seated in the plate 50. The rotating assembly 35 also includes a large lower plate 70 and a large upper plate 71 both secured to the small plate 65. The small plate 65 and the large upper plate 71 have a number of aligned openings 72 and 73 extending through them into radial alignment with the groove 51 and the openings 60 and 61 of the stationary plate 50. The lower plate 70 is provided with a series of radially extending grooves 74, one for each of the openings 72 and 73 and connected thereto at its inner extremity, to define a radial conduit. At the outer extremity of each groove 74 a nozzle 75 may be attached. Preferably, the plates 70 and 71 are secured together very tightly by a large number of bolts 76, so that there is no question of leakage, and bolts 76a extend through the plates 70, 71, and 65 and are threaded into a nut plate 76b.

Each nozzle 75 (see FIGS. 6 and 7) is preferably inserted in a downwardly extending opening 77 and held in place by a bracket 78, which also retains an O-ring 79 to avoid leakage. The O-ring 79 also holds the nozzle 75 in place. The bracket 78 is secured to the plate 70 by a machine screw 80, and the nozzle 75 is located by having a disc 81 brazed thereto, with a notch 82 in the disc 81 and a pin 83 through the bracket 78. The nozzle 75 may extend directly down, perpendicular to the plate 70, but preferably it is provided with an angular trailing portion 84, extending generally tangential to the rotary path of the nozzle 75 and trailing. The portion 84 has one or more apertures 85. If one seed at a time is to be dispensed, one aperture 85 is enough, and it is usually located on the lower part of the cylindrical surface, as shown in FIG. 7; if two or three seeds are to be dispensed at each place, two or three apertures 85 are provided, as in the nozzle 87 of FIG. 8; they need not necessarily be on the same side of the trailing portion 84 of the nozzle 75. The nozzles 75 are readily removable, and spacing between them may be increased by inserting plugs in place of some of the nozzles at regular spacing—e.g., every other opening 77 may be plugged, or two out of every three may be plugged—or there may be a nozzle 75 for each radial groove 74. Also, the nozzles 75 may be changed to provide nozzles having different size apertures for different size seeds.

As a result of the structure so far described, the nozzles 75 move with the rotating assembly 35, and, due to the inclined mounting of the assemblies 35 and 36, the nozzles 75 dip down into the seed tray 40 at the nadir of their path and rise above the seed tray 40 to the zenith of their path. Just before they dip down and until they nearly reach the zenith, the nozzles 75 are connected by the radial grooves 74 and the openings 73 and 72 to the annular groove 51; hence, when they dip down into the seeds 24, they pick up a seed at each aperture 85 and lift the seeds out from the seed tray 40. At the zenith of their path at the dispensing station 23, each nozzle 75 is connected through its radial groove 74 and openings 73 and 72 to the opening 60, so that the atmospheric or slightly above-atmospheric air bleed releases the seed 24, so that it falls onto the tape 20, which at this very point is brought across above the seed tray 40 and beneath the nozzles 75, propelled by the two rollers 21 and 22. Preferably, the tape is troughed, and this may be done by providing a trough-like supporting member 86 which extends over the rotating seed tray 40 to assure that the tape 20 does remain in a trough-like shape. Various other means for doing this are also usable; for example, the troughed seed tape stands free during dispensing, as in patent application Ser. No. 605,251. After the seeds 24 are dropped onto the tape 20, the seed tape is closed together and sealed under pressure by the rollers 21 and 22.

The nozzles 75 preferably move at about the same peripheral speed as the speed of the tape 20 at the dispensing station 23. As a result, the spacing between the seeds 24 on the tape 20 is about the same as the arc length between adjacent nozzles 75. The spacing of seeds 24 on the tape 20 will be exactly the same as the arc length between nozzles 75 when the two speeds are identical. By using the variable speed transmission 32, the nozzle speed may be made slightly faster than the tape speed, and then the seeds 24 will be spaced more closely on the tape 20. Or, the nozzle speed may be made slightly slower than the tape speed, and then the seeds 24 will be spaced farther apart on the tape 20. Thus, a wide variety of spacing may be obtained for the same nozzle spacing.

Also, since the seed tray 40 rotates in the same direction as the assembly 35, seed pickup is improved, for the nozzles 75 may be moving at fast speeds, and yet their speed relative to the seed tray 40 may be zero or at least slow. Even for very high speeds of the nozzles 75, a speed of half that value by the tray 40 cuts in half the relative speed and enables improved pickup without introducing too much centrifugal force.

Before troughing, it is desirable to moisten the water-soluble tape 20 so that the forcing of the tap 20 together by the rollers 21 and 22 will encapsulate the seed 24 and seal the seed tape 20. This is important, because the seed 24 should be protected from the atmosphere so that the tape 20 can be stored for comparatively long times without a substantial decrease in the seed's ability to germinate. Also, it is important that moistening of the tape 20 does not reduce the germination ability of the seed 24. Hence, for many seeds it is desirable that no moisture come into contact with the seed 24 itself, the seed being retained in the tape 20 only by the encapsulation, not by adhesion, retained, that is, as a result of having fallen into the center of the trough. For this purpose, I prefer to provide a spray device 90 (see FIGS. 1 and 2) which sprays a very sparse spray of water, such that only a thimbleful is used up in several hours of operation and such that perhaps a gallon of water is consumed in a few weeks of production. The spray 90 is preferably mounted above the tape 20, with a sponge 91 below it to catch any drops that overreach, and the spray 90 is preferably protected by a guard 92 which has an upper portion 93 around the spray 90 to protect it from drafts or touching, and a lower portion 94 around the sponge 91. This guard 92 may be an open boxlike member with an opening 95 adjacent the tape 20 and is also open on top so that there is no build-up of pressure. The spray is directed preferably all on one side of the center line of the tape 20 at the time before it is cupped, and preferably the moisture pattern, as shown in FIG. 1, is spaced away from the center line so that there will be no moisture in contact with the seed itself.

Before the seed nozzle 75 reaches its dispensing station 23, it is desirable to make sure that each aperture 85 carries only one seed. Sometimes excess seeds have been picked up by the nozzles 75 unintentionally. To prevent this, I provide an air jet 96 (see FIG. 1) above the seed tray 40 to blow excess seeds off the nozzle 75 and back into the tray 40. The air jet 96 is, of course, ahead of the dispensing station 23 and blows in a tangential direction toward the oncoming seeds. The jet of air is adjusted to blow off all seeds except those where one is retained at each aperture. The jet of air is adjusted to the seed used, and it need not be great, in any case.

Past the seed dispensing station 23, the nozzle 75 should be blown out and cleaned, ready to get more seed, by the above-atmospheric air coming from the opening 61 to the plate 50. Since the seed tray 40 is moving and is annular, it is important not to blow into the seed tray 40. For that reason, I provide a stationary plate 97 (see FIG. 1) supported closely adjacent the seed tray 40 and covering over that portion of the seed tray's path where the blowing-out of the nozzle 75 takes place.

The invention also provides for automatic replenishment of seeds 24 in the seed tray 40. For this purpose, a seed hopper 100 (see FIGS. 1 and 2) with an additional supply of seeds 24 is located above a feeding trough 101 preferably generally V in shape and having a V-shaped slide 102, preferably emptying into the seed tray 40 at a point beyond the point where the seeds 24 are picked up by the nozzles 75 and before the dispensing station 23. The trough 101 has a vibrator 103, and no seeds are dispensed down the slide 102 except when the vibrator 103 is energized. As shown in FIGS. 1 and 9, a leveling and level-control plate 104, a bent plate preferably shaped as an arcuate segment, is supported in a floating pivoted manner by a free pivot 105 at a stationary position above the seed tray 40. This accomplishes two purposes, for this floating plate 104 first serves to level the seeds 24 within the seed tray 40 so that any furrow created by the nozzles 75 is filled in again. Second, the pivoted floating plate 104 is set to actuate a microswitch 106 when the plate 104 is lowered to a predetermined height. When the plate 104 is in the angular position corresponding to a position of normal seed depth in the tray 40, the microswitch 106 is actuated to deactuate the vibrator 103, but when the plate 104 drops below that to its set position, the microswitch 106 is actuated to energize the vibrator 103 and additional seed 24 is fed into the seed tray 40.

In operation, then, the drive roll 21 and idle roll 22 press against the tape 20 and pull it along and propel it forward to a suitable windup device, not shown. As the tape 20 moves along, a spot of moisture is placed on it from the spray 90 to form a continuous strip of very sparsely concentrated moisture that will later enable the tape 20 to be sealed. Then the tape 20 is cupped and guided by the trough 86 beneath the seed dispensing station 23 where seeds 24 are dropped into the tape 20, and the seed 24 is then encapsulated between two layers of tape 20 by the folding over of the troughed tape 20 and the pressure exerted between the drive roll 21 and idle roll 22. Meanwhile, the seed tray 40 is moving around in the same direction as the rotating assembly 35 so that their relative speeds are governed to what is the best under the situation, considering both the centrifugal force problem of the seed tray 40 and the problem of relative speed between the nozzles 75 and the seed 24 at the time of pickup. Seed is picked up by each seed nozzle 75, which dips down into the tray 40 and then rises from it, due to the angular inclination of the assembly 35 relative to the tray 40. Each nozzle 75 is then subjected to the air jet 96 to dislodge any extra seeds that may accidentally have been picked up, and then, at the station 23, the nozzles 75 pass over the seed tape 20 at the time that the atmospheric bleed releases the seed, and the seed is deposited on the tape 20 by dropping down on it. Then the nozzle 75 is blown out while the plate 97 protects the seed in the seed tray 40 from this blowing. The seed supply is renewed from time to time by actuation of the microswitch 106, which starts the vibrator 103 at attainment of a certain level of the seed in the seed tray, as indicated by the plate 104.

If the timing of the release of the seed 24 from the nozzle aperture 85 at the dispensing station 23 is not quite right, the seed may drop off too soon or too late. This timing can be adjusted by first loosening screws 110, which are threaded into the plate 50 and act to clamp a thin plate 111 both to the plate 50 and to the arm 49. With the screws 110 loosened, the plate 50 can be rotated slightly relative to the arm 49 and then reclamped to it by tightening the screws 110. The idea is to adjust the plate 50 to locate the opening 60 at exactly the right place for optimum release of the seeds 24, rotation of the plate 50 counterclockwise (looking from above) giving an earlier release of the seeds, while rotation clockwise results in later release.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A method for putting seeds onto tape at regular intervals, in the manufacture of seed tape, comprising:
    moving a bed of seeds around a first horizontal circular path,
    picking up seeds individually from said bed by vacuum at one stationary location along said first circular path and dropping them by release of the vacuum at a second stationary location diametrically opposite from the pickup location, the picking up and release of seeds being carried out in a second circular path at a rotational velocity in the same general direction of rotation as that of said bed, so that the speed of pickup relative to the speed of the seed being picked up is substantially smaller than the absolute speed of pickup, and
    moving the tape continuously in a straight line passing beneath said second stationary location and above said bed, at a steady velocity roughly equal to the tangential speed of the seed as it is released, so that the seeds are dropped on the tape at regular intervals at about the same spacing as that at which they are picked up from the seed bed.

2. The method of claim 1 wherein the spacing of the seeds on the tape is varied by varying the rotary speed of pickup and release relative to the speed of the tape.

3. The method of claim 1 wherein the speed of pickup relative to the seed bed is varied by varying the rotational speed of the seed bed, to obtain optimal adjustment between the relative pickup speed and the centrifugal force acting on the rotating seed bed.

4. The method of claim 1 wherein the proportional speeds of the tape, the pickup and release of seeds, and the seed bed may be varied proportionally to vary the rate of making the seed tape while keeping the relative proportions of the speeds the same.

5. The method of claim 1 wherein the tape is water soluble, having the steps of moistening the tape slightly on one face thereof along an area all to one side of center before the seed is dispensed thereon, and then closing the tape on itself to hold the seed in an unmoistened portion of the tape while the closing together seals the tape to itself and encapsulates the seed.

6. The method of claim 1 including the steps of detecting the level of seeds in said bed and adding additional seeds automatically when the level drops below a predetermined bed height.

7. The method of claim 1 including the step of blowing excess seeds that were accidentally picked up back into the seed bed at a locus between the pickup point and the release point.

8. A machine for putting seeds onto tape at regular intervals, in the manufacture of seed tape, comprising:
    means for moving a bed of seeds around a first horizontal circular path,
    seed pickup and dispensing means for rotating vacuum seed pickup means in a second circular path inclined to the horizontal and generally overlying said first circular path, for pickup of seeds from said bed at one stationary location along said first path and for dropping the seeds by release of vacuum at a second stationary location along said second path and diametrically opposite the pickup location, said seed bed and said seed pickup and dispensing means moving in the same general rotational direction, to lessen their relative speed as compared with the absolute speed of the pickup means, and
    means for moving tape continuously in a straight line to pass beneath said second stationary location and above said bed, at a steady velocity roughly equal to the tangential velocity of said vacuum pickup means,
    whereby the seeds are dropped on the tape at regular intervals at about the same spacing as that at which they are picked up from the seed bed.

9. The machine of claim 8 having means for varying the spacing of seeds on said tape by varying the speed of the seed pickup and dispensing means relative to the speed of the tape.

10. The machine of claim 8 having means for varying the speed of the seed bed relative to that of said seed pickup and dispensing means.

11. The machine of claim 8 having means for varying the speeds of said seed bed and of said seed pickup and dispensing means proportionally when the speed of the seed tape is varied.

12. The machine of claim 8 having spray means for moistening sparsely the tape to one side of the center line thereof.

13. The machine of claim 8 having troughing means for holding the tape in a trough shape as it receives the seeds.

14. The machine of claim 8 having feed means for adding additional seeds to said bed, and means actuated by the level of seeds in said bed for actuating said feed means when the level drops below a predetermined height.

15. The machine of claim 8 having means for blowing off excess seeds accidentally picked up by said seed pickup means before they reach said second stationary location.

16. The machine of claim 8 having cleanout means for blowing out said seed pickup means after they have passed said second stationary location, and means for protecting said seed bed from disturbance during said blowing out.

17. A device for dispensing seeds onto a moving tape during the manufacture of seed tape, comprising:
    an annular seed-carrying tray, mounted for rotary movement around its center on a generally horizontal plane,
    a generally planar rotating seed pickup assembly having a series of conduits extending out radially from the center thereof, and seed-pickup nozzle means extending down from the outer ends of said conduits, said pickup assembly being mounted at an angle to said tray, so that said nozzles go down into said tray to pick up seeds therefrom and then are lifted up out of said tray to a high point diametrically opposite their low point, means to provide vacuum pickup suction to said conduits and to their nozzle means while said nozzle means dip into said tray and pass through the seeds therein and to retain the vacuum for each said nozzle means for an angular distance thereafter as said nozzle means leaves said tray carrying seed, means for moving said tape at a substantially constant velocity beneath said nozzle means and above said tray at approximately said high point, and means for releasing the vacuum from said nozzle means as they pass over said seed tape.

18. The device of claim 17 wherein the tangential velocity of said nozzle means is approximately the same as the linear velocity of said tape.

19. The device of claim 18 having means for varying the velocity of said tape while also varying in the same proportion the velocity of said rotating assembly and the velocity of said seed tray.

20. The device of claim 19 having means for varying the velocity of said rotating assembly relative to the velocity of said tape at any speed of the tape, for varying the spacing of seeds on said tape.

21. The device of claim 20 also having means for varying the velocity of said seed tray relative to the velocity of said rotating assembly at any speed thereof.

22. The device of claim 17 having troughing means in the path of said seed tape before it reaches the place where it receives seed from said nozzle means, for troughing said seed tape.

23. The device of claim 22 wherein said troughing means includes a rigid trough guiding said tape beneath said nozzle means.

24. The device of claim 22 having before said troughing means a device for moistening said tape, said device comprising spray means for sparsely spraying water on said tape.

25. The device of claim 24 wherein said spray means deposits its water on less than half of said tape all to one side of the center line of said tape.

26. The device of claim 17 wherein:

said rotating assembly comprises two plates, at least one of which is grooved radially to provide a regularly spaced series of said conduits, said plates being secured tightly together to prevent leaks, said grooved conduits having at their outer ends outlets through one said plate at the same radius, to which said nozzle means are attached and having inlets through one said plate at their inner ends all at one radius near the center of said plates, stationary support means having a plate with a long first arcuate groove and a short second arcuate groove lying along an annular path and having first, second and third opening means along said annular path, said first opening means leading into said first arcuate groove, said second opening means leading into said second arcuate groove and said third opening lying between the end of said first arcuate groove and the beginning of said second arcuate groove, vacuum producing means connected to said first arcuate portion by said first opening means, approximately atmospheric pressure bleed means connected to said third opening means, and above-atmospheric pressure means connected to said second opening means.

27. The device of claim 26 having a stationary plate overlying said seed tray at the sector where said nozzle means pass at the time when they are connected to said above-atmospheric pressure means.

28. The device of claim 26 having means for rotating said plate of said stationary support means through a small arc to adjust the timing of release of said seed by said bleed means.

29. The device of claim 17 having seed level detector means overlying the seeds in said seed tray and seed feeding means for supplying said seed tray with additional seeds and actuated by said seed level detector means when the level of seeds in said seed tray is below a predetermined height.

30. The device of claim 29 wherein said seed level detector means comprises a bent plate-like annular segment that also levels off the seeds in said seed tray and floats over them and actuates a microswitch which, in turn, actuates said feeding means.

31. The device of claim 17 having air jet means above said seed tray and below said rotating assembly between the point where the nozzles rise above said seed tray and the point where they reach said seed tape, for dislodging excessive seeds that said nozzle means may have picked up.

32. The device of claim 31 wherein said air jet means directs its jet tangentially of the path of the seeds and in the opposite direction to the direction of movement of the seeds.

33. The device of claim 17 wherein the seed tray is annular with a bottom wall between generally vertical inner and outer walls, the bottom wall being sloped downwardly toward said outer wall.

34. A machine for putting seeds onto tape at regular intervals, in the manufacture of seed tape, comprising:

means for bodily moving a bed of seeds along a first path, seed pickup and dispensing means for moving seed pickup means along a second path inclined to said first path and meeting and receding from said first path, for pickup of seeds from said bed and for later releasing the seeds at a location along said second path where the two paths have receded, said seed bed and said seed pickup and dispensing means moving in the same general direction at their meeting, to lessen their relative speed as compared with the absolute speed of the pickup means, and means for moving tape past said location at a velocity roughly equal to that of the seed when it is released, whereby the seeds are deposited on the tape at regular intervals at about the same spacing as that at which they are released.

35. The machine of claim 34 having means for varying the spacing of seeds on said tape by varying the speed of the seed pickup and dispensing means relative to the speed of the tape.

36. The machine of claim 34 having means for varying the speed of the seed bed relative to that of said seed pickup and dispensing means.

37. A machine for putting seeds onto tape at regular intervals, in the manufacture of seed tape, comprising:

means for moving a bed of seeds in a first circular path, seed pickup and dispensing means for rotating seed pickup means in a second circular path inclined to the first circular path, for pickup of seeds from said bed at one fixed location along said first path and for releasing the seeds at a second fixed location along said second path, said seed bed and said seed pickup and dispensing means moving in the same general rotational direction, to lessen their relative speed as compared with the absolute speed of the pickup means, and means for moving tape continuously past said second fixed location at a steady velocity roughly equal to the tangential velocity of said pickup means, whereby the seeds are dropped on the tape at regular intervals at about the same spacing as that at which they are released.

38. The machine of claim 37 having means for varying the spacing of seeds on said tape by varying the speed of the seed pickup and dispensing means relative to the speed of the tape.

39. The machine of claim 37 having means for varying the speed of the seed bed relative to that of said seed pickup and dispensing means.

40. A method for putting seeds onto tape at regular intervals, in the manufacture of seed tape, comprising:
moving a bed of seeds along a first path,
picking up seeds individually from said bed and later releasing them, the picking up and release of seeds being carried out in a second path at a velocity in the same general direction as that of said bed at the time of pickup so that the speed of pickup relative to the speed of the seed being picked up is substantially smaller than the absolute speed of pickup, and
moving the tape past the point of release at a velocity roughly equal to that of the seed as it is released,
so that the seeds are deposited on the tape at regular intervals at about the same spacing as that at which they are released.

41. The method of claim 40 wherein the spacing of the seeds on the tape is varied by varying the rotary speed of pickup and release relative to the speed of the tape.

42. A method for putting seeds onto tape at regular intervals, in the manufacture of seed tape, comprising:
moving a bed of seeds in a first circular path,
picking up seeds individually from said bed at one fixed location along said first circular path and releasing them at a second fixed location, the picking up and release of seeds being carried out in a second circular path inclined to said first circular path at a rotational velocity in the same general direction of rotation as that of said bed, so that the speed of pickup relative to the speed of the seed being picked up is substantially smaller than the absolute speed of pickup, and
moving the tape continuously past said second fixed location, at a steady velocity roughly equal to the tangential speed of the seed as it is released,
so that the seeds are deposited on the tape at regular intervals at about the same spacing as that at which they are released.

43. The method of claim 42 wherein the spacing of the seeds on the tape is varied by varying the rotary speed of pickup and release relative to the speed of the tape.

References Cited

UNITED STATES PATENTS

| | | | |
|---|---|---|---|
| 2,641,298 | 6/1953 | Kinnear | 47—56 X |
| 2,747,351 | 5/1956 | Whitecar | 53—180 X |
| 3,380,626 | 4/1968 | Giannini | 221—211 X |

THERON E. CONDON, Primary Examiner

E. F. DESMOND, Assistant Examiner

U.S. Cl. X.R.

53—180; 221—211